Figure 1:
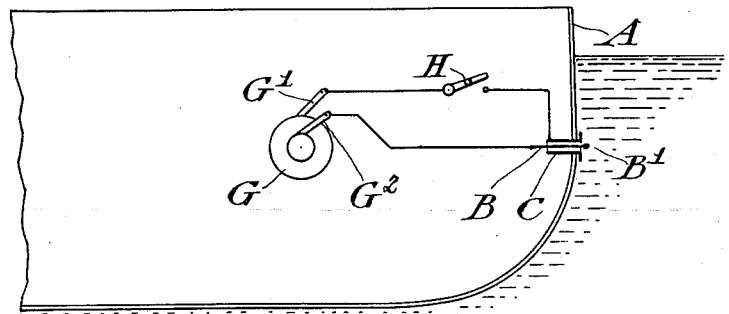

T. BODDE.
SUBMARINE SIGNALING.
APPLICATION FILED MAY 22, 1909.

1,152,697.

Patented Sept. 7, 1915.
2 SHEETS—SHEET 1.

WITNESSES:

INVENTOR
Theodore Bodde
BY
his ATTORNEY

T. BODDE.
SUBMARINE SIGNALING.
APPLICATION FILED MAY 22, 1909.
1,152,697.
Patented Sept. 7, 1915.
2 SHEETS—SHEET 2.
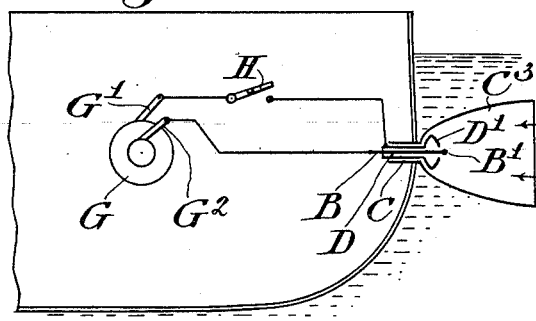
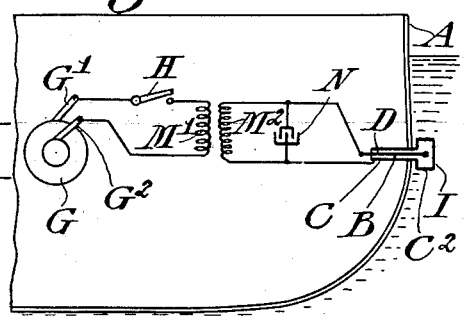
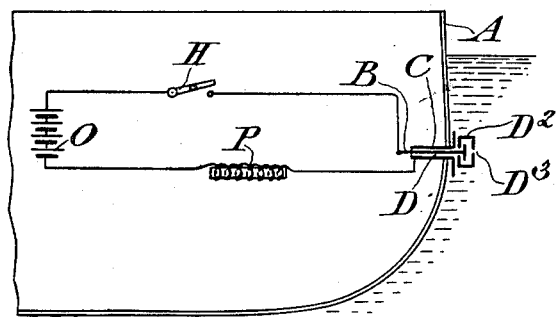
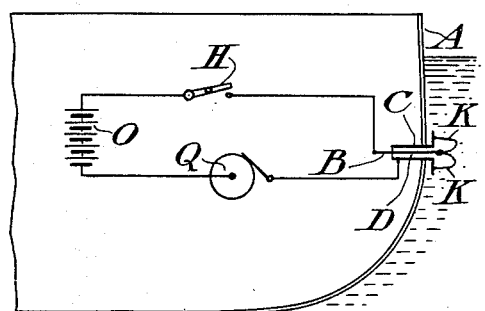
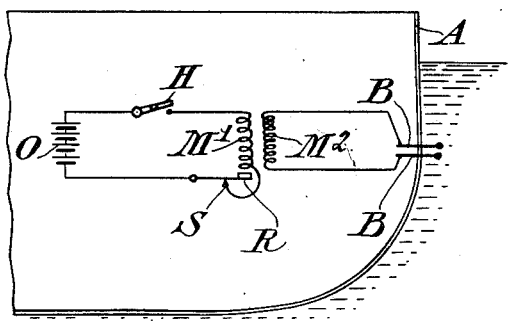
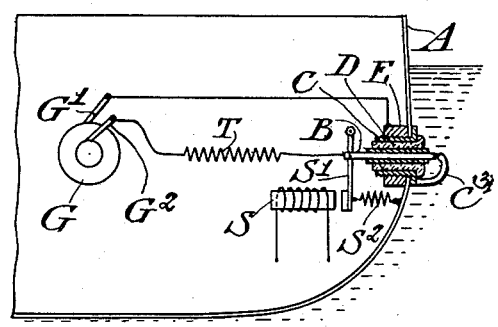
WITNESSES:
INVENTOR
Theodore Bodde
BY
Francis J. C. Lumber
his ATTORNEY.

UNITED STATES PATENT OFFICE.

THEODORE BODDE, OF BRANT ROCK, MASSACHUSETTS.

SUBMARINE SIGNALING.

1,152,697.  Specification of Letters Patent.  Patented Sept. 7, 1915.

Application filed May 22, 1909. Serial No. 497,592.

*To all whom it may concern:*

Be it known that I, THEODORE BODDE, a subject of the Queen of Holland, residing in Brant Rock, in the county of Plymouth, in the State of Massachusetts, have invented a certain new and useful Improvement in Submarine Signaling, of which the following is a true and exact description, reference being had to the accompanying drawings, which form a part thereof.

The present invention relates to the transmission of audible signals through water. It is well known that the method of signaling by means of sound waves transmitted through the water has certain important advantages in marine work, over signaling by means of lights or by means of sound waves transmitted through the air. Signaling by means of lights is highly effective in clear weather, but is totally ineffective in cloudy or foggy weather, and signaling by means of sound waves transmitted through the air is ineffective and highly unreliable, particularly during cloudy or foggy weather. The changes in density of air produced by the wind, and also by clouds and fog, make it difficult to determine the direction from which the sound originates when it is heard at all, and makes the distance from the point of transmission at which the sound may be heard a very uncertain and variable quantity. The density of the water, on the other hand, is not materially affected by the weather or the motion of the water, and, in consequence, the distance from the point of transmission at which signals may be heard through the water remains practically constant, and by making suitable provisions at the receiving station, the direction from which the sound comes through the water can be determined with substantial accuracy. For instance, in the case of ships it has been found entirely feasible to determine the general direction from which the sound transmitted through the water is received by providing two telephonic receiving devices, each secured to the hull of the ship below the water line and arranged one on the port side and the other on the starboard side of the ship. The difference in intensity of the sound heard at the two receiving distances enables the direction of the source of sound to be determined with fair accuracy.

Heretofore, so far as I am aware, the only device employed for generating sound waves traveling through the water which has been used in practice is the submerged bell and striker, the striker being actuated by an electric motor, compressed air motor, wave motor, or other suitable device.

One object of the present invention is to provide a method of, and apparatus for, generating sound waves in water which will travel farther than those which it is practical to produce with the submerged bell and striker, and which give a control of the frequency or pitch of the sound waves not practically possible with the bell and striker.

A further object of the invention is the provision of sound wave generating apparatus which, on account of its relatively small bulk and the manner in which it may be mounted on a ship, can be much more conveniently and effectively arranged and supported on the ship than can the usual submerged bell. In the present use of audible submarine signals, the sound producing bell used on a ship is hung over the side of the ship and is not easy to manipulate, especially when the ship is in motion.

In carrying out my invention,—and broadly speaking, the essence of my invention consists in this,—I cause an intermittent flow of electricity of a character to produce disturbances in the surrounding medium to occur under such circumstances that the impulses of electrical current operate directly to set the water into vibration with the desired frequency and amplitude of vibration for the transmission of sound of the desired pitch and intensity through the water.

The apparatus which I may use for the purpose may be of many different forms and in the accompanying drawings and descriptive matter I have illustrated and described several of these forms.

It will be apparent to those skilled in the art, however, that the invention in its broader forms may be embodied in, or carried out by, other apparatus than that disclosed, although the invention in its narrower aspects consists in part in certain features of combination and arrangement peculiar to the apparatus shown and described.

Figure 2:
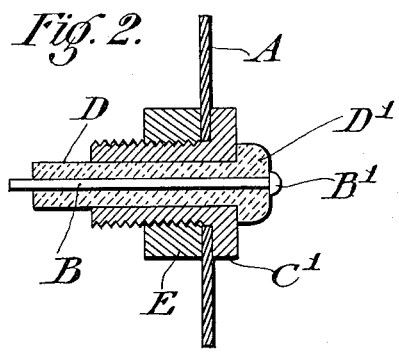

Of the drawings, Figure 1 is a diagrammatic elevation of a portion of a ship equipped with one form of my new signal sending apparatus. Fig. 2 is a sectional elevation of the electrical, sound wave generating device employed in the arrangement shown in Fig. 1. Figs. 3, 4, 5 and 6 are each taken similarly to Fig. 2 and each shows a construction differing in some respects from that of each of the other figures of this group. Fig. 7 is a diagrammatic elevation, partly in section, illustrating a sound wave reflector for causing sound waves to be concentrated and sent in one direction. Fig. 8 is a view, similar to Fig. 1, illustrating current supply connections, different from those in Fig. 1, employed in conjunction with the transmitter shown in Fig. 3. Figs. 9, 10 and 11 are each taken similarly to Figs. 1 and 8, and each illustrate circuit connections differing from those shown in Figs. 1 and 8, the particular transmitters shown in Figs. 9, 10 and 11 being the same as those shown in Figs. 4, 5 and 6 respectively. Fig. 12 is a diagrammatic view, partly in section, illustrating another form of wave generator and circuit connections.

In the drawings, and referring first to the construction shown in Figs. 1 and 2, A represents the wall or skin of a vessel, and X the surface of the water in which the vessel floats. C is an electrode in the form of a bushing passing through an opening formed in the hull wall A, and secured in place by means of a collar or flange $C'$ on the outer end of the bushing C, and a nut E screwed on the inner threaded end of the bushing C. Of course it will be understood that the collar $C'$ and nut E may have clamped between them either a partition of the regular hull wall of the ship or a portion of a plate or other special wall portion. D is a bushing of insulating material having an enlarged and rounded head $D'$ at its outer end which bears against the flange $C'$, and B represents a conductor or electrode centrally disposed in the bushing D, and provided at its outer end with a small enlargement or sparking knob $B'$. In Fig. 1 the conductor B and the bushing C are shown connected to the brushes $G^2$ and $G'$ of an alternating current generator G. H represents a switch by means of which the circuit of the generator may be interrupted. The generator G causes a flow of alternating current to take place between the knob $B'$ and the outer exposed end of the flange $C'$, and with each current impulse, that is, for each half wave of the alternating current flow produced by the generator G, some of the water surrounding the small knob $B'$ is vaporized, and the water medium between the knob $B'$ and collar $C'$ is subjected to a powerful strain, thus creating a powerful wave impulse in the water. By regulating the frequency of the current supplied by the generator G, the frequency of the wave impulses imparted to the water in which the ship floats may be made to produce a musical tone at the receiving device of the most favorable pitch for detecting sound at a considerable distance, for instance the frequency of the sound waves in the water may well range between five hundred and one thousand per second. By manipulating switch H to open and close the energizing circuit intelligible signal waves may be transmitted. With the sending device of Figs. 1 and 2, moreover, the source of current may be a direct current source, for if the circuit has sufficient inductance the device will operate satisfactorily as a Wehnelt interrupter to produce a pulsating current of the proper frequency.

Figure 3:
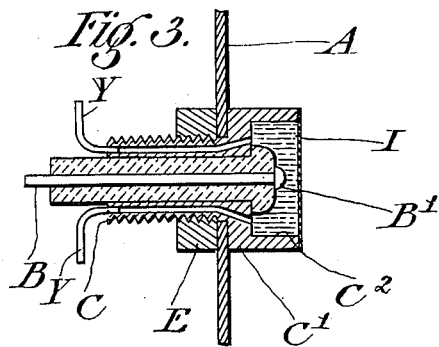

The transmitter shown in Fig. 3 differs from that shown in Fig. 2 in that the head, or flange, $C'$ of the electrode bushing C is enlarged and forms a chamber $C^2$ surrounding the sparking knob $B'$, the front wall of this chamber being closed by a thin flexible metallic diaphragm I. The space within the chamber $C^2$ is filled with some non-conducting fluid such as oil or distilled water. The passage of an intermittent current of electricity of suitable intensity between the knob $B'$ and the wall of the chamber $C^2$ creates powerful disturbances, or surges, in the fluid inclosed in the chamber, and these impulses are transmitted through the flexible diaphragm I to the water in which the device is submerged. Pipes Y, Y form a means for filling the chamber $C^2$, and if desired, for obtaining a circulation of the insulating fluid through the chamber. In place of a liquid such as oil or distilled water, the chamber $C^2$ may be filled with air or other gas, but in such case the device is less effective than when the filling is a comparatively incompressible liquid.

In the diagram shown in Fig. 8, in which the transmitter of Fig. 3 is employed, the circuit connections are slightly different from those shown in Fig. 1. In Fig. 8 the brushes $G'$, $G^2$ of the generator G are connected to the terminals of the primary coil $M'$ of the transmitter, and the secondary $M^2$ of the transformer has its terminals connected, one to the conductor B and the other to the bushing C. A condenser N is connected across the terminals of the secondary $M^2$ in shunt with the gap between the electrodes D and C. It will be understood, however, that the circuit arrangements of Figs. 1 and 2 can be interchangeably used with the transmitters of Figs. 2 and 3.

Figure 4:
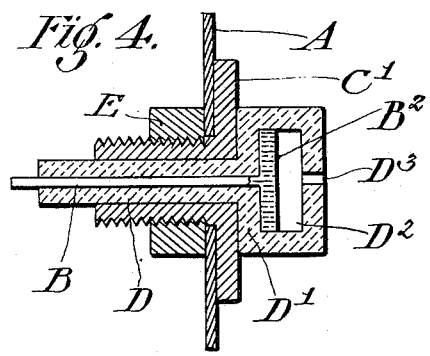

In the form of the transmitter shown in Fig. 4, the head $D'$ of the insulating bushing D is enlarged to form a chamber $D^2$ open at its outer end through a restricted passage $D^3$. In this form also the head $B^2$ of the conductor B, located within the chamber $D^2$, is a flat disk or pole of substantial size. With this arrangement, when a suitable intermittent current flow is maintained between the pole B² and the flange C' of the bushing C, the vaporization occurring at the exposed end of the pole B² will cause powerful jets to be forced through the small port D³. The electric discharge between the exposed electrode portions B² and C' takes place in the water in which these electrode portions are submerged and passes through the aperture D³. The electrodes B and C of Fig. 4 may be connected within the ship to any suitable source of alternating current, as by the means illustrated in Figs. 1 and 8. With the transmitter shown in Fig. 4, moreover, an intermittent current flow may be obtained between the submerged electrodes by connecting them to the terminals of a suitable direct current source such as the source O of Fig. 9, for when a suitable reactance P is provided in circuit with the electrodes of the transmitter and the source of direct current, the device will act as a Wehnelt interrupter to make the flow of current a pulsating one.

Figure 5:
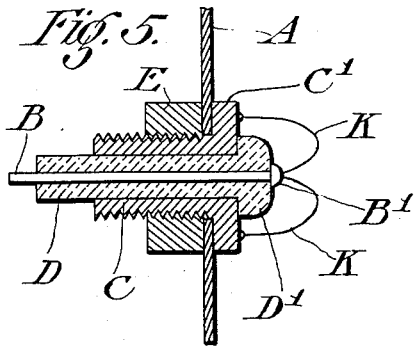

The transmitter shown in Fig. 5 differs from that shown in Fig. 2 only in that the knob B' is connected to the flange C' of the electrode C by one or more filaments K, formed of platinum or like metal, so chosen that they will be raised to incandescence at each pulsation of current flow.

In Fig. 10 I have shown the circuit connections for a transmitter, such as is shown in Fig. 5, which comprise a source of direct current O and a rotating commutator Q interrupting the current flow to give the necessary pulsations.

Figure 6:
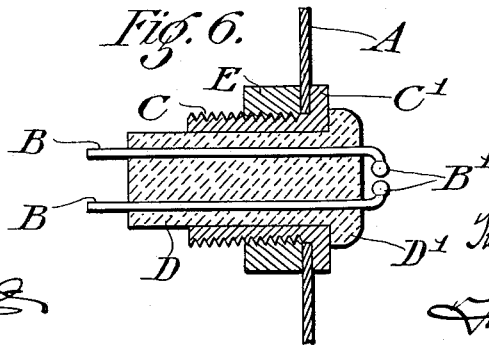

In the form of transmitter shown in Fig. 6 the bushing C does not serve as an electrode, but merely as a securing device. In this form, two similar electrodes B passing through the insulating bushing D are employed. The electrodes B terminate in small sparking knobs B' facing one another.

In Fig. 11 I have shown means for supplying alternating current to the two electrodes B of Fig. 6 which comprises a transformer, to the terminals of the secondary M² of which, the electrodes B are connected. The primary of the transformer M' is connected to a source O of direct current, but the circuit includes the movable armature R, in inductive relation with the coil M', and the stationary contact S whereby the circuit through the primary is automatically made and broken with the desired frequency and the consequent production of an alternating current in the secondary M². It will of course be understood that the means for producing an alternating or pulsating current flow as shown in Figs. 1, 8, 10 and 11 may be interchangeably used.

In the form of the apparatus shown in Fig. 12, the electrode B is movable and is normally spring held by the spring S² and armature lever S' in the position in which it contacts with an extension C³¹ of the bushing or electrode C. S represents an electromagnet which when energized moves the lever S' to draw the electrode B out of contact with the electrode extension C³. The electrodes B and C are connected to the brushes G' and G² of an alternator G, and the circuit includes a resistance T. The circuit including the alternator and the electrodes being closed, the magnet S is energized, and electrode B thereby moved out of contact with the electrode extension C³. An arc is drawn, the arc current having of course the frequency of the alternator G. In practice I prefer to arrange the apparatus so that the increased resistance of the arc will cause the arc to break before or by the time the electrode B is given its maximum movement of separation. By opening and closing the circuit of the alternator G at predetermined intervals intelligible signals may obviously be transmitted. The apparatus of Fig. 12 possesses an advantage over the other forms shown in that it may be worked at substantially lower voltages.

In Fig. 7 I have shown a modification of the transmitter shown in Fig. 2 in which a parabolic reflector, formed by an extension C³ of the bushing C, is provided. This reflector surrounds the knob B' and serves to direct the sound waves produced by the use of the transmitter in a direction parallel to the arrows shown.

It will be observed that in all forms of the invention the transmitting device is readily attachable to the skin of a vessel or other shell or wall to which it may be desired to secure the transmitter, that the transmitter is relatively compact and small, and this, of course, is a substantial advantage particularly where the transmitter is applied to ships, since it is not likely on the one hand to be injured by contact with vessels, dock walls, or the like, and on the other hand does not impede the movement of the ship to which it is attached. It is apparent, of course, that the frequency of the sound waves produced may be easily varied by varying the frequency of alternation or pulsation of the intermittent current flow. This not only permits the pitch of the sound waves to be brought into the range most favorable for transmission but permits each sending device to have its own distinctive tone. By operating a circuit closing and breaking device such as the switch H, the usual dot and dash code signal may be transmitted.

Having now described my invention, what I claim as new, and desire to secure by Letters Patent, is:

1. The method of generating sound waves in water for submarine signaling which consists in passing an intermittent electric current through a fluid medium and thereby setting up mechanical stresses in such fluid medium and translating such mechanical stresses into sound waves in the water.

2. A sending device for submarine signaling adapted to be attached to the hull of a ship below the water line thereof, and comprising separated electrodes and means whereby when said electrodes are connected to a suitable source of electrical energy a current flow of electricity will take place between said electrodes of a character to generate sound waves in the water.

3. Sending apparatus for submarine signaling, comprising a pair of submerged electrodes, and means for causing an intermittent flow of electricity between said electrodes in the water in which the electrodes are submerged.

4. A sending device for submarine signaling secured to the wall of the ship below the water line thereof and comprising electrodes having portions exposed externally of the ship.

5. A sending device for submarine signaling comprising electrodes and means whereby they are secured to the wall of the ship below the water line thereof with portions of said electrodes exposed externally of the ship.

6. In combination with the hull of a ship, electrodes passing through said hull below the water line and externally exposed, and means within the ship for subjecting said electrodes to such differences in electric potential that an intermittent flow of electricity will take place between said electrodes.

THEODORE BODDE.

Witnesses:
 THOMAS B. BLACKMAN,
 LAURENCE E. BLACKMAN.